(12) United States Patent
Welnowski et al.

(10) Patent No.: US 11,017,590 B2
(45) Date of Patent: May 25, 2021

(54) SYSTEM AND METHOD FOR LIGHTING DESIGN AND REAL TIME VISUALIZATION USING INTUITIVE USER INTERPHASE AND CONTROLS IN COMPOSITION WITH REALISTIC IMAGES

(71) Applicant: DURACOMM CORPORATION, Kansas Ctiy, MO (US)

(72) Inventors: Richard Welnowski, Kansas City, MO (US); Jay Garcia, Kansas City, MO (US); Benny Lee, Kansas City, MO (US)

(73) Assignee: DURACOMM CORPORATION, Kansas City, MO (US)

( * ) Notice: Subject to any disclaimer, the term of this patent is extended or adjusted under 35 U.S.C. 154(b) by 0 days.

(21) Appl. No.: 16/100,085

(22) Filed: Aug. 9, 2018

(65) Prior Publication Data
US 2019/0051038 A1 Feb. 14, 2019

Related U.S. Application Data

(60) Provisional application No. 62/543,301, filed on Aug. 9, 2017.

(51) Int. Cl.
*G06T 15/50* (2011.01)
*G06F 3/0484* (2013.01)
(Continued)

(52) U.S. Cl.
CPC ........ *G06T 15/506* (2013.01); *G06F 3/04817* (2013.01); *G06F 3/04842* (2013.01);
(Continued)

(58) Field of Classification Search
CPC .............. G06T 15/506; G06F 3/04817; G06F 3/04842; G06F 3/04845; G06F 3/04847; G06F 3/04855
See application file for complete search history.

(56) References Cited

U.S. PATENT DOCUMENTS 7,924,310 B1 4/2011 Dicarlo et al.
8,866,841 B1 10/2014 Distler
(Continued)

OTHER PUBLICATIONS

International Search Report and Written Opinion for PCT/US2018/046134, dated Nov. 28, 2018.

*Primary Examiner* — Chong Wu
(74) *Attorney, Agent, or Firm* — Kutak Rock LLP (57) ABSTRACT

A lighting visualization system and methods for visualizing lighting scenarios for an object is provided. The system includes a graphic user interface for displaying a rendered image of the object, the rendered image representing a selected lighting scenario for the object. The system includes a control panel for indicating a value of parameters associated with the selected lighting scenario, each parameter being associated with at least one light source. The control panel includes a means for adjusting at least one parameter associated with at least one light source, thereby changing the selected lighting scenario. Upon changing the selected lighting scenario, the rendered image is modified and/or replaced. Each rendered image is rendered using a three-dimensional model of the object, one or more high-quality image of the object being utilized for creating the three-dimensional model.

18 Claims, 2 Drawing Sheets

(51) Int. Cl.
*G06F 3/0481* (2013.01)
*G06F 3/0485* (2013.01)

(52) U.S. Cl.
CPC ...... *G06F 3/04845* (2013.01); *G06F 3/04847* (2013.01); *G06F 3/04855* (2013.01)

(56) References Cited

U.S. PATENT DOCUMENTS

| | | | |
|---|---|---|---|
| 2006/0176303 A1* | 8/2006 | Fairclough | G06T 15/50 345/426 |
| 2010/0080448 A1 | 4/2010 | Tam et al. | |
| 2010/0259197 A1 | 10/2010 | Boleko Ribas | |
| 2012/0280995 A1* | 11/2012 | Anderson | G06T 13/20 345/426 |

* cited by examiner

SYSTEM AND METHOD FOR LIGHTING DESIGN AND REAL TIME VISUALIZATION USING INTUITIVE USER INTERPHASE AND CONTROLS IN COMPOSITION WITH REALISTIC IMAGES

CROSS-REFERENCE TO RELATED APPLICATIONS

This application claims priority pursuant to 35 U.S.C. 119(e) to U.S. Provisional Patent Application Ser. No. 62/543,301, filed Aug. 9, 2017, the entire disclosure of which is incorporated herein by reference.

FIELD OF THE INVENTION

The present invention relates generally to lighting design. More specifically, the present invention relates to a system and method for architectural lighting design and visualization based on high-resolution realistic photography or videos that combine with intuitive graphical user interphase (GUI) to (in some embodiments) control lights in real time. This system and methodology is especially valuable for retrofitting (or providing new lighting) for existing architectural historical buildings, which were designed before CAD and 3D visualization software.

BACKGROUND

Lighting for buildings and other structures or locations are extremely important for both safety and aesthetic reasons. When the lighting for a particular location is being designed, it is often useful to create a visualization of how the location will look under various lighting conditions. This is traditionally done through extremely labor intensive and expensive, artisan-type processes, or through CAD processes that fail to provide a realistic lighting affect with texture and depth. In addition, the use of Digital Multiplexing (DMX) lighting has become very common in many situations, such as for illuminating exteriors of buildings, bridges, streets, fountains or other architectural or industrial manmade objects, natural objects such as mountains, trees, and the like, or even interior objects such as sculptures or works of art. The use of DMX lighting allows for the control of a variety of different lighting effects at a single location. For example, different colors of lights can be utilized for special events or certain times of the year; or different levels of lighting can be utilized for different situations (e.g. higher levels of lighting in emergency situations). Conventional software and hardware systems of the prior art allow for the control of DMX lighting, but are very complex for users to adjust to desired lighting levels. Existing DMX lighting controls do not provide lighting controls on realistic imaging, and to the extent any imaging is provided do so only on 3D simple mockups. All existing lighting control software originated from theatrical lighting or complex event lighting controls and do not take into account architectural properties, like ambient lights, existing lights, and time of the day.

Therefore, it is desirable to provide a system and method for visualizing different lighting effects that is able to be accomplished more easily and quickly than those of the prior art. In addition, it is desirable to provide an improved system and method for the real-time control of lighting effects.

SUMMARY

The instant invention provides a system and method for visualizing different lighting effects and an improved system and method for the real-time control of lighting effects. The system and method of the inventive concept utilizes a real, high-resolution photograph of a structure/location for which illumination is desired. A realistic three-dimensional file is created based upon the photograph that includes texture and depth for the structure/location. Once the three-dimensional file is created, IES files for desired lighting components are input into the system at desired locations within the three-dimensional file. Because the file includes depth and texture, modeling software is able to create a realistic visualization of the lighting effects. The inventive system captures within a computer program of the inventive concept visualizations for a spectrum of different colors and intensities, including ambient lighting and other conditions for the location.

The computer program of the inventive system provides user input controls for adjusting the lighting effects and conditions on the realistic image to allow the user to visualize the spectrum of lighting conditions. In some embodiments, the inventive system is connected to or part of the lighting controller hardware, allowing the user to see a realistic visualization of how the lighting effect will look on the area and make adjustments in real-time without necessarily being on location. In some such embodiments, the GUI of the inventive concept is at a remote location from the lights that are being controlled. The inventive concept is useful for visualization and/or control of lighting effects for buildings, bridges, streets, fountains or other architectural or industrial manmade objects, natural objects such as mountains, trees, and the like, or even interior objects such as sculptures or works of art (any object or location for which lighting is desired).

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
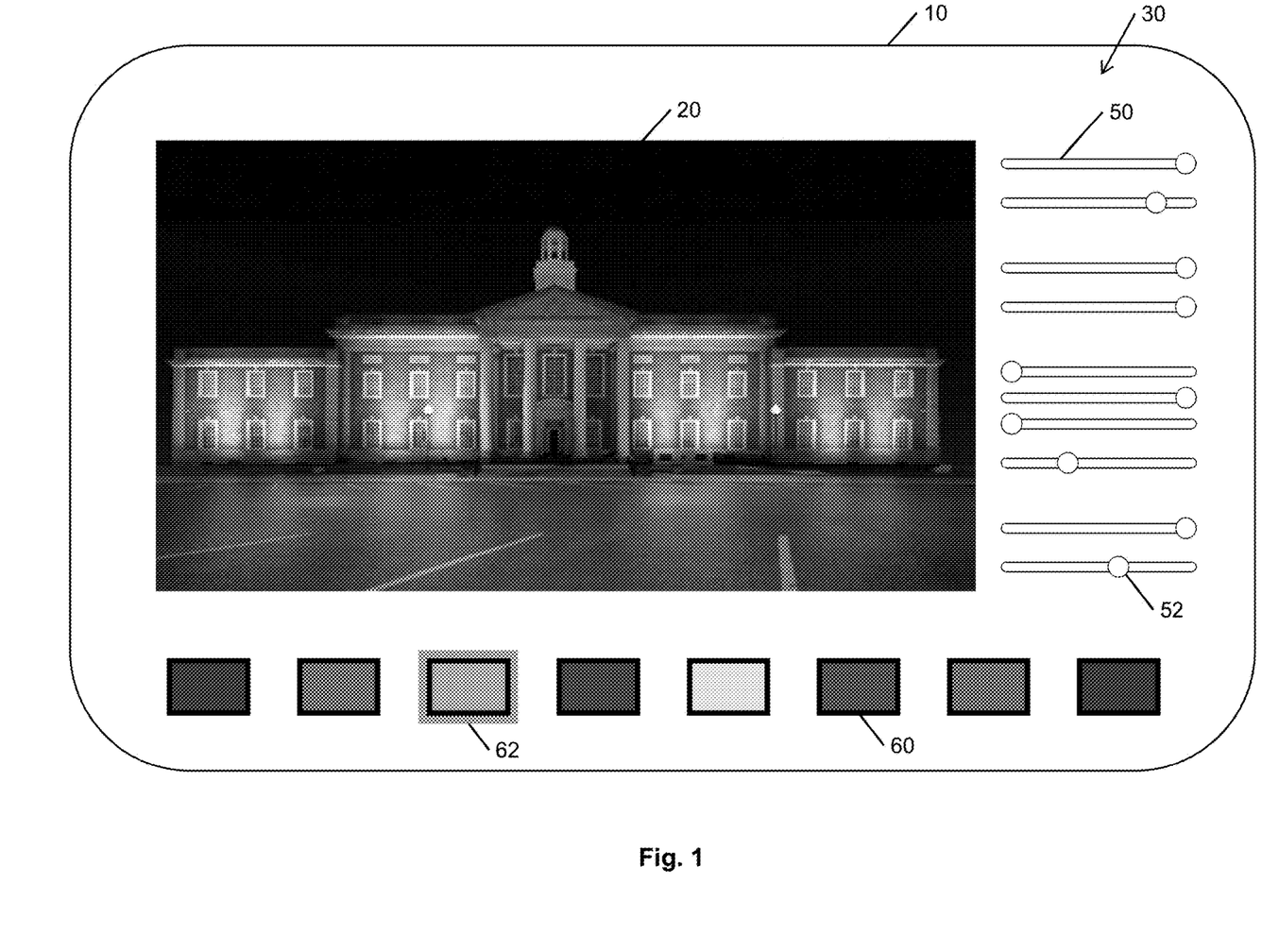
FIG. 1 shows a graphic user interface of the present invention, the graphic user interface having a primary display area showing a first rendered image, the first rendered image representing a first lighting scenario for an object.

Referring to FIG. 1, the system of the present invention is configured to display graphics as part of a graphic user interface (GUI) 10. In some embodiments, the GUI comprises a primary display area 20 showing a visual representation of one or more object, area, or the like (each an "object"). In some embodiments, the object is an architectural object, such as one or more building, bridge, street, fountain, and the like. In some embodiments, the object is a natural object such as one or more mountain, tree, body of water, and the like. In some embodiments, the object is a design object, a decoration, a banner, a flag, a work of art (such as one or more sculpture, painting, picture, and the like), and/or any other object for which lighting is desired.

In some embodiments, the visual representation of the one or more object is a rendered image of a three-dimensional model (3D Model) of the object. In some embodiments, at least a portion of the 3D Model is acquired from one or more other system, such as an engineering and/or architectural system. In some embodiments, an image of the object, such as a high-quality image, is utilized for generating the 3D Model. In some embodiments, the system includes a means for capturing and/or otherwise receiving one or more image of the object.

In some embodiments, a first image is taken at a first time of day, under a first set of environmental conditions and with a first lighting configuration (a "first lighting scenario") and a second image is taken at a second time of day, under a second set of environmental conditions and with a second lighting configuration (a "second lighting scenario"). In some embodiments, a plurality of images represent different combinations of lighting and/or shadowing effects associated with the object and/or its surroundings. In some embodiments, one or more image is pre-processed by the system or otherwise processed so as to filter out, to emphasize, and/or to otherwise alter a representation of one or more person, item, lighting effect, environmental condition, or the like.

In some embodiments, a plurality of images from different angles and/or distances are utilized for producing the 3D model. In some embodiments, the system categorizes images in one or more set of images based on time, distance, angle, and/or one or more other variable associated with such images. In some embodiments, the system is configured to produce a plurality of 3D models associated with one or more set of images. In some embodiments, one or more 3D model is utilized in rendering a plurality of rendered images associated with a plurality of-selected lighting scenarios and/or effects. In some embodiments, first and second lighting scenarios include each light source of a first set of light sources being in respective first and second lighting configurations. In some embodiments, first and second lighting scenarios include each light source of respective first and second sets of light sources being in a first lighting configuration. In some embodiments, first and second lighting scenarios include each light source of respective first and second lighting configurations being in respective first and second lighting configurations.

In some embodiments, the system includes a database for storing information associated with one or more feature of the 3D model, such as color, depth, texture, and the like. In some embodiments, the system includes and/or is in communication with a database associated with lighting elements, such as standard and/or modified lighting elements. In some embodiments, the system is configured to associate one or more lighting element with the 3D model, thereby enabling the creation of a digital representation (i.e. a "rendered image") of an existing and/or planned lighting configuration/scenario. In some embodiments, the system includes a location protocol for locating and/or orienting one or more source of light ("light source") relative to the 3D model. In some embodiments, anticipated and/or measured lighting effects associated with the location and/or orientation of the one or more light source are utilized for rendering one or more associated rendered image.

In some embodiments, the system includes a control panel 30 having a plurality of indication elements for showing one or more value of one or more parameter associated with a currently displayed rendered image. In some embodiments, the control panel 30 includes a plurality of control elements for allowing a user to adjust one or more parameter, thereby causing the system to adjust an existing rendered image, to replace the existing rendered image with a different rendered image, and/or to generate a new rendered image. In some embodiments, one or more control element is linked to and/or serves as an indication element.

In some embodiments, the system includes a plurality of slide bars 50, each slide bar being associated with a slider 52 for providing an indication of a current setting associated with a currently displayed rendered image. In some embodiments, the system includes an adjustment protocol for adjusting one or more setting. In some embodiments, the adjustment protocol enables a user to input a specific adjustment, such as by sliding a slider 52 along a corresponding slide bar 50, by entering a specific value for one or more setting, by selecting a pre-determined configuration associated with one or more setting, by indicating an incremental increase and/or decrease associated with one or more setting, or by otherwise adjusting one or more setting using one or more means now known or later developed. In some embodiments, the system includes an automation protocol for changing one or more setting over a period of time, thereby allowing a user to visualize a time-lapse representation of lighting effects associated with the object and one or more light source.

In some embodiments, the system is configured to adjust ambient lighting associated with an object. In some embodiments, the ambient lighting is adjustable from a first level associated with low (or even no) ambient lighting (such as at night) and a second level associated with bright ambient lighting (such as during mid-day). In some embodiments, the system is configured to be adjustable to a plurality of intermediate ambient lighting conditions. In some embodiments, ambient lighting is associated with lighting from one or more primary and/or secondary light source, such as the sun, the moon, the stars, street lamps, or the like. In some embodiments, the system is configured to recognize a location of one or more primary light source associated with ambient lighting, regardless of whether such light source remains in a fixed position relative to the object. In some embodiments, the system is configured to adjust ambient lighting based on one or more lighting scenario.

Figure 2:
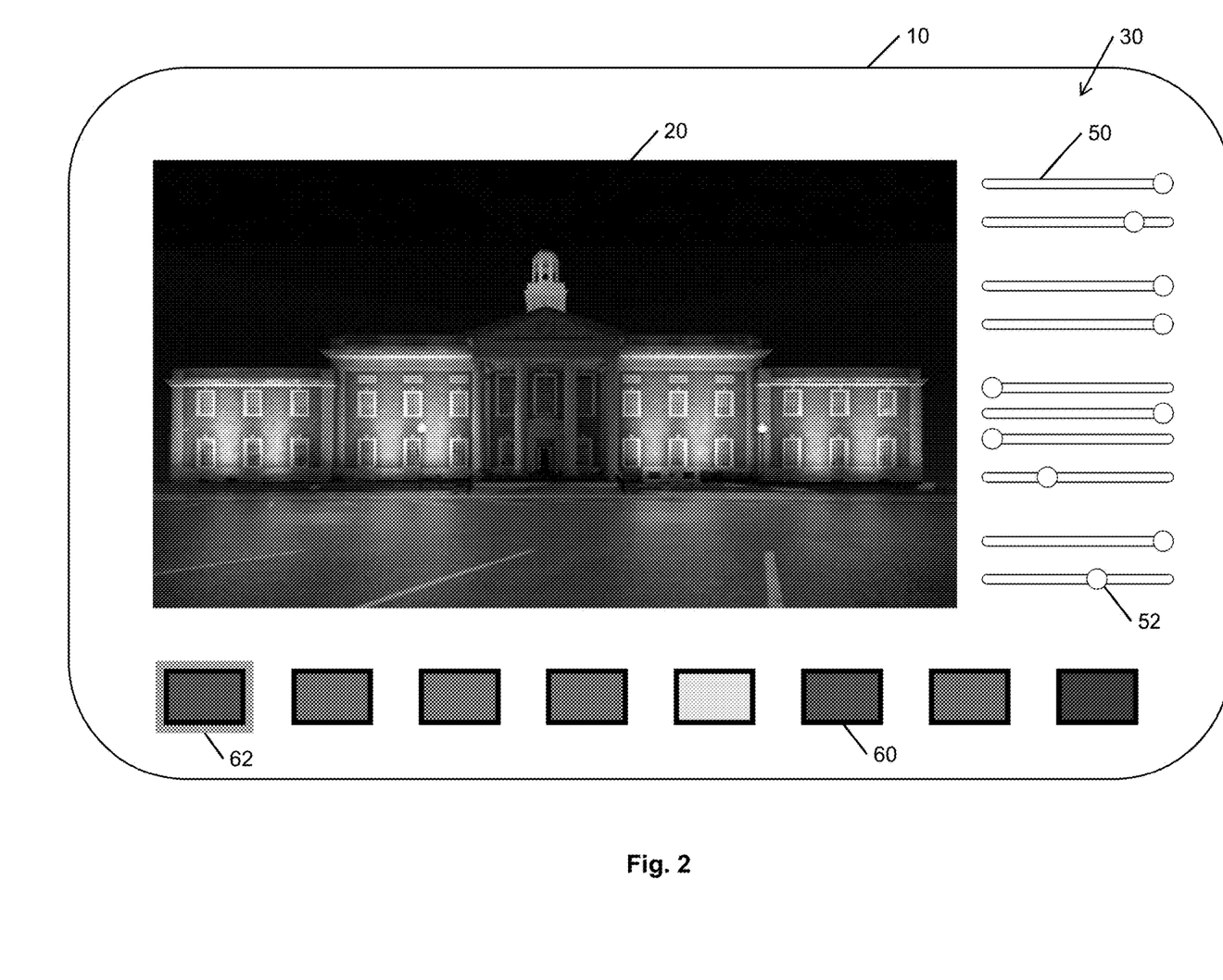
FIG. 2 shows a graphic user interface of the present invention, the graphic user interface having a primary display area showing a second rendered image, the second rendered image representing a second lighting scenario for an object.

In some embodiments, the system includes one or more adjustment means, such as one or more slider 52, associated with a lighting element and/or a group of lighting elements, such as porch lights, street lights, interior lights, landscape lighting, and/or one or more other light associated with the object. Referring to FIGS. 1 and 2, the system is capable of rendering lighting effects associated with a plurality of street lights positioned in close proximity to a building such that lighting from the street lights at least partially illuminates a portion of the building and/or an area surrounding the building.

In some embodiments, the system includes one or more adjustment means associated with one or more feature and/or area of an object. Referring to FIGS. 1 and 2, the system is capable of rendering different lighting effects associated with different areas of a building, such as a white light effect associated with a brick portion of a building, a blue or red lighting effect associated with a transition portion of the building, a green or blue lighting effect associated with a portico of a building, a green or red lighting effect associated with a cupola. It will be appreciated that certain embodiments of the present invention are configured to render a visual representation of a variety of lighting effects on a variety of objects, such as by way of producing a rendered image representing each such visual representation. It is further understood that the system is configured to adjust each visual representation based on a number of factors, including ambient lighting, depth and texture of an object, quantity of lighting elements, intensity and color of each lighting element, and/or a variety of other variables now known or later developed.

In some embodiments, the system includes one or more time bar, such as a time bar representing a time associated with one or more rendered images. In some embodiments, the time bar is a slide bar associated with a slider. In some embodiments, moving the slider along the slide bar causes ambient and/or other lighting to change, as if changing over a predetermined period of time. In some embodiments, changes to ambient lighting and/or other lighting is accomplished by showing a series of rendered image, each rendered image being associated with a respective point in time of a predetermined period of time. In some embodiments, a timer indicator, such as a slider, is configured to be positioned relative to the timer bar based on a configuration of one or more rendering of the object. In some embodiments, first and second positions of the timer bar are associated with respective first and second times and/or are associated with respective first and second lighting scenarios. In some embodiments, a plurality of positions on the timer bar between the first and second positions each represent one or more intermediate time and/or intermediate lighting scenarios. In some embodiments, the system includes a means for changing a rate of transition between one or more time and/or lighting scenario. In some embodiments, the means of changing a rate of transition includes a slide bar and/or a slider.

In some embodiments, the system includes an indication of one or more light source available for use with one or more physical object and/or with one or more feature of a physical object, such as light sources that are currently installed with respect to the physical object and/or light sources that could be utilized with the physical object. In some embodiments, the system provides a means of identifying whether a visual representation of the object is rendered using information associated with one or more existing and/or available light source. In some embodiments, the system includes a means of changing one or more parameter associated with one or more light source, such as a color, a brightness, a location, an angle, and/or one or more other parameter associated with such light source. In some embodiments, the system is configured to adjust a rendered image and/or to create and/or identify a different rendered image based on one or more adjustment and/or a proposed adjustment to one or more light source.

In some embodiments, the GUI includes a control panel 30 having one or more selectable element 60 associated with one or more light source. In some embodiments, the control panel 30 includes a selection indicator 62 associated with one or more selectable element 60 so as to provide an indication of one or more selectable element 60 being selected. In some embodiments, one or more selectable element is associated with a color associated with one or more light sources. In some embodiments, the system is configured to update the primary display area 20 based on the selection and/or deselection of one or more selectable element 60. In some embodiments, the system is configured to provide color selections based on available color choices, previous color choices, pre-selected color choices, and/or one or more other consideration.

In some embodiments, the control panel 30 includes a first set of selectable elements associated with a first light source when the control panel 30 is in a first configuration and a second set of selectable elements associated with a second light source when the control panel 30 is in a second configuration. In some embodiments, the control panel 30 includes a means to switch the control panel 30 between the first and second configurations, thereby enabling a user to manipulate one or more parameter of a respective first or second light source. In some embodiments, manipulating one or more parameter associated with a first or second light source causes the system to change the display of the primary display area from a first rendered image to a second rendered image.

In some embodiments, the present invention includes a method of visualizing a plurality of potential lighting scenarios. In some embodiments, the method includes displaying a first or second rendered image in a primary display area of a graphic user interface based on one or more configuration of one or more light source. In some embodiments, the method comprises displaying an indication of the one or more parameter associated with one or more light source, such as an intensity, a state (i.e. on, off, high, low, etc.), a position, an angle, a color, or the like. In some embodiments, the method comprises replacing a first rendered image with a second rendered image upon the occurrence of an adjustment event. In some embodiments, an adjustment event includes changing one or more parameter associated with a light source and/or changing one or more scenario associated with an object.

In some embodiments, the present invention includes a method of indicating a value of one or more parameter associated with one or more light source.

In some embodiments, the method of indicating a value of one or more parameter includes positioning a first slider 52 at a first or second position relative to a first slide bar 50, the first slide bar being associated with a first parameter of a first light source and the first and second positions relative to the first slide bar being associated with respective first and second configurations of the light source, the first and second configurations of the light source being associated with respective first and second lighting scenarios for the object. In some embodiments, the system is configured such that a first slider 52 is positioned at a first position relative to a first slide bar 50 while a primary display area is displaying a first rendered image associated with the first light source. In some embodiments, the system is configured such that a first slider 52 is positioned at a second position relative to a first slide bar 50 while a primary display area is displaying a second rendered image associated with the first light source. In some embodiments, the present invention includes a method of changing a displayed image from a first rendered image to a second rendered image by moving the first slider from a first position to a second position relative to a first slide bar, the first and second positions of the slide bar being associated with respective first and second lighting scenarios of an object represented in the first and second rendered images.

In some embodiments, the method of indicating a value of one or more parameter includes positioning a first selection indicator 62 relative to a first or second selection element 60, the first and second selection elements being associated with a first parameter (such as a color) and further being associated with respective first and second lighting scenarios for an object. In some embodiments, the system is configured such that a first selection indicator 62 is positioned at a first position adjacent to a first selectable element 60 while a primary display area is displaying a first rendered image associated with the first light source. In some embodiments, the system is configured such that the first selection indicator is positioned at a second position adjacent to a second selectable element 60 while the primary display area is displaying a second rendered image associated with the first light source. In some embodiments, the present invention includes a method of changing a displayed image from a first rendered image to a second rendered image by moving the first indication element from the first position to the second position. In some embodiments, the method changing a displayed image includes selecting the second selectable element while the first selection indicator is in the first position, thereby causing the first selection indicator to move from the first position to the second position.

In some embodiments, one or more selection element and/or indication element is associated with a first set of elements, a second set of elements, and/or one or more other set of elements. In some embodiments, the control panel displays a first set of elements associated with a first light source, thereby providing an indication of one or more parameter associated with the first light source and/or providing a user with a means of adjusting one or more parameter of the first light source. In some embodiments, the system is configured so as to selectively replace the first set of elements with a second set of elements associated with a second light source, thereby providing an indication of one or more parameter associated with the second light source and/or providing a user with a means of adjusting one or more parameter of the second light source. In some embodiments, the control panel is configured to simultaneously show one or more element of each set of elements.

Various embodiments of the computer program, devices, systems, and methods of the present invention are implemented in hardware, software, firmware, or combinations thereof using central management system of the invention, which broadly comprises server devices, computing devices, a communications network, and access ID (account number, etc.). Various embodiments of the server devices include computing devices that provide access to one or more general computing resources, such as Internet services, electronic mail services, data transfer services, and the like. In some embodiments the server devices also provides access to a database that stores information and data, with such information and data including, without limitation, system user information (e.g. ID, account number, etc.), information lighting features, lighting effects, the three-dimensional models, or the like, or other information and data necessary and/or desirable for the implementation of the computer program, devices, systems, and methods of the present invention.

Various embodiments of the server devices and the computing devices include any device, component, or equipment with a processing element and associated memory elements. In some embodiments the processing element implements operating systems, and in some such embodiments is capable of executing the computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos, identification codes or other identification information.

In some embodiments the computing devices includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of the computer program of the present invention run on computing devices. In other embodiments the computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on the memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using the computer program will actually be performed by one or more computers, processors, or other computational devices, such as the computing devices and/or server devices, independently or cooperatively executing portions of the computer program.

A user is capable of accessing various embodiments of the present invention via an electronic resource, such as an application, a mobile "app," or a website. In certain embodiments, portions of the computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A lighting visualization system comprising:
   a graphic user interface (GUI) comprising a control panel and a primary display area, said primary display area being configured to display one or more rendered image associated with a digital model of an object;
   a processor in digital communication with the GUI, said processor being configured to render a first rendered image based on a first lighting scenario; and
   a first database in digital communication with the processor, said first database being configured to store one or more sets of information associated with rendering the rendered image,
      wherein the first lighting scenario comprises information associated with a first set of light sources being in respective first lighting configurations,
      wherein the processor is configured to render a second rendered image based on a second lighting scenario, the second lighting scenario comprising information associated with one of the first set of light sources or a second set of light sources being in respective second lighting configurations, and
      wherein a first light source of the first set of light sources is a Digital Multiplexing light source, the first light source being moveable between a plurality of color configurations, wherein the control panel comprises a first set of selectable elements when the control panel is in a first display configuration, each selectable element of the first set of selectable elements being associated with a respective color configuration of the first light source.

2. The system of claim 1, wherein the second set of light sources comprises at least one light source that is not included in the first set of light sources.

3. The system of claim 1, wherein the second configuration of each light source of the first set of light sources differs from a respective first configuration of such light source.

4. The system of claim 1, wherein a first light source of the first set of light sources is an ambient light source, wherein the control panel comprises a first slide bar associated with the first light source, wherein the first lighting configuration of the first light source is a low ambient lighting configuration, and wherein a first slider is positioned at a left-most end of the first slide bar while the primary display area is displaying the first rendered image.

5. The system of claim 4, wherein the second lighting configuration of the first light source is a high ambient lighting configuration and wherein the first slider is positioned at a right-most end of the first slide bar while the primary display is displaying the second rendered image.

6. The system of claim 1, wherein the control panel comprises a selection indicator associated with the first set of selectable elements while the control panel is in the first display configuration, wherein the first selection indicator is associated with a first selectable element while the primary display area is displaying the first rendered image, the first selectable element being associated with the first configuration of the first light source.

7. The system of claim 6, wherein the control panel is configured so as to allow a user to select a second selectable element of the first set of selectable elements, thereby causing the selection indicated to be associated with the second selectable element, wherein the second selectable element is associated with the second configuration of the first light source and wherein selecting the second selectable element causes the primary display to display the second rendered image.

8. The system of claim 1, wherein a second light source of the first set of light sources is a Digital Multiplexing light source, the second light source being moveable between a plurality of color configurations, wherein the control panel comprises a second set of selectable elements when the control panel is in a second display configuration, each selectable element of the second set of selectable elements being associated with a respective color configuration of the second light source.

9. The system of claim 8, wherein the control panel comprises a selection indicator associated with a first selectable element of the first or second set of selectable elements while the primary display area is displaying the first rendered image and the control panel is in the first or second display configuration, respectively.

10. A method of visualizing a plurality of potential lighting scenarios associated with an object, the method comprising:
displaying a first rendered image in a primary display area of a graphic user interface (GUI); and
replacing the first rendered image with a second rendered image upon the occurrence of an adjustment event,
wherein the first and second images are rendered using a digital model of the object and information associated with respective first and second lighting scenarios for the object,
wherein the first lighting scenario comprises information associated with a first set of light sources being in respective first lighting configurations,
wherein the second lighting scenario comprises information associated with one of the first set of light sources or a second set of light sources being in respective second lighting configurations,
wherein the adjustment event comprises changing a configuration for at least one light source of the first or second sets of light sources, and
wherein a first light source of the first set of light sources is a Digital Multiplexing light source, the first light source being moveable between a plurality of color configurations, wherein a control panel of the graphic user interface comprises a first set of selectable elements when the control panel is in a first display configuration, each selectable element of the first set of selectable elements being associated with a respective color configuration of the first light source.

11. The method of claim 10, wherein the second set of light sources comprises at least one light source that is not included in the first set of light sources.

12. The method of claim 10, wherein the second configuration of each light source of the first set of light sources differs from a respective first configuration of such light source.

13. The method of claim 10, wherein a first light source of the first set of light sources is an ambient light source, wherein a control panel of the graphic user interface comprises a first slide bar associated with the first light source, wherein the first lighting configuration of the first light source is a low ambient lighting configuration, and wherein a first slider is positioned at a first position relative to the first slide bar while the primary display area is displaying the first rendered image.

14. The method of claim 13, further comprising sliding the slider along the slide bar from the first position to a second position, thereby causing the primary display area to replace the first rendered image with the second rendered image, the second position along the slide bar being associated with the second lighting scenario.

15. The method of claim 10, wherein the control panel comprises a selection indicator associated with the first set of selectable elements while the control panel is in the first display configuration, wherein the first selection indicator is associated with a first selectable element while the primary display area is displaying the first rendered image, the first selectable element being associated with the first configuration of the first light source.

16. The method of claim 15, further comprising selecting a second selectable element of the first set of selectable elements, thereby causing the selection indicator to be associated with the second selectable element, wherein the second selectable element is associated with the second configuration of the first light source and wherein selecting the second selectable element causes the primary display to display the second rendered image.

17. The method of claim 10, wherein a second light source of the first set of light sources is a Digital Multiplexing light source, the second light source being moveable between a plurality of color configurations, wherein the control panel comprises a second set of selectable elements when the control panel is in a second display configuration, each selectable element of the second set of selectable elements being associated with a respective color configuration of the second light source.

18. The method of claim 17, wherein the control panel comprises a selection indicator associated with a first selectable element of the first or second set of selectable elements while the primary display area is displaying the first rendered image and the control panel is in the first or second display configuration, respectively.

\* \* \* \* \*